United States Patent
Pribula et al.

(10) Patent No.: US 6,702,282 B2
(45) Date of Patent: Mar. 9, 2004

(54) CARD TRANSPORT MECHANISM ROLLER SUPPORT

(75) Inventors: Martin A. Pribula, Eden Prairie, MN (US); Gary M. Klinefelter, Eden Prairie, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 0 days.

(21) Appl. No.: 10/127,024

(22) Filed: Apr. 19, 2002

(65) Prior Publication Data

US 2002/0171728 A1 Nov. 21, 2002

Related U.S. Application Data

(63) Continuation-in-part of application No. 09/866,309, filed on May 25, 2001, and a continuation-in-part of application No. 09/702,116, filed on Oct. 30, 2000, which is a continuation-in-part of application No. 09/178,455, filed on Oct. 23, 1998, now Pat. No. 6,264,296

(60) Provisional application No. 60/207,494, filed on May 26, 2000, and provisional application No. 60/063,043, filed on Oct. 24, 1997.

(51) Int. Cl.$^7$ .................................................. B65H 5/00
(52) U.S. Cl. ...................... 271/272; 271/271; 271/264; 384/435; 384/440; 384/418
(58) Field of Search ................................ 271/271, 272, 271/264; 384/418, 419, 428, 439, 440

(56) References Cited

U.S. PATENT DOCUMENTS

| | | | | |
|---|---|---|---|---|
| 1,224,874 A | * | 5/1917 | Wolfe | 384/440 |
| 2,631,069 A | * | 3/1953 | Starr | 384/439 |
| 3,598,396 A | | 8/1971 | Andrews et al. | 271/9 |
| 3,713,735 A | * | 1/1973 | Wilber | 399/124 |
| 3,755,653 A | | 8/1973 | Venker | 235/61.11 |
| 3,889,472 A | | 6/1975 | Guillaud | 60/698 |

(List continued on next page.)

FOREIGN PATENT DOCUMENTS

| | | | |
|---|---|---|---|
| DE | 25 35 699 A1 | 3/1977 | |
| EP | 0 562 979 | 9/1993 | |
| EP | 0 887 197 | 12/1998 | |
| EP | 0 979 736 | 2/2000 | |
| EP | 0 992 347 A2 | 4/2000 | |
| EP | 0 995 603 A2 | 4/2000 | |
| GB | 2 120 821 A | 12/1983 | |
| JP | 62297540 A * | 12/1987 | F16C/35/02 |
| JP | 03103614 A * | 4/1991 | F16C/17/02 |
| JP | 406226995 A | 8/1994 | 347/90 |
| JP | 10337886 | 12/1998 | |
| JP | 411105359 A | 4/1999 | |
| JP | 11265463 | 9/1999 | |
| JP | 11 265463 | 9/1999 | |
| WO | WO 95/09084 | 4/1995 | |
| WO | WO 98/51507 | 11/1998 | |
| WO | WO 99/04368 | 1/1999 | |
| WO | WO 99/21713 | 5/1999 | |
| WO | 99/49379 | 9/1999 | |

OTHER PUBLICATIONS

Notification of Transmittal of the International Search Report with a copy of the International Search Report, for International Application No. PCT/US 01/17146, filed May 25, 2001.

(List continued on next page.)

Primary Examiner—Donald P. Walsh
Assistant Examiner—Kaitlin Joerger
(74) Attorney, Agent, or Firm—Westman, Champlin & Kelly

(57) ABSTRACT

A roller support includes a body member, a bushing member, and a step member. The body member includes a first guide roller receiver that is adapted to receive an end of a first guide roller. The bushing member extends from a surface of the body member and has a central bore that extends through the body member. The step member is positioned adjacent the bushing member and extends from the surface of the body member in the direction of the bushing member.

15 Claims, 9 Drawing Sheets

U.S. PATENT DOCUMENTS

| | | | |
|---|---|---|---|
| 3,960,072 A | 6/1976 | Ahlgren et al. | 101/35 |
| 4,015,839 A | 4/1977 | McKee | 271/37 |
| 4,017,068 A | 4/1977 | McKee | 271/275 |
| 4,031,518 A | 6/1977 | Holloran et al. | 340/172.5 |
| 4,068,028 A | 1/1978 | Samonides | 428/40 |
| 4,102,267 A | 7/1978 | Ritzerfeld | 101/132.5 |
| 4,146,900 A | 3/1979 | Arnold | 346/75 |
| 4,161,312 A | 7/1979 | Eckhardt et al. | 271/3 |
| 4,393,386 A | 7/1983 | Di Giulio | 346/75 |
| 4,534,313 A | 8/1985 | Louvel | 118/696 |
| 4,604,631 A | 8/1986 | Jinnai et al. | 346/1.1 |
| 4,680,596 A | 7/1987 | Logan | 346/140 |
| 4,685,702 A | 8/1987 | Kazuharu | 283/81 |
| 4,686,540 A | 8/1987 | Leslie et al. | 346/33 |
| 4,716,346 A | 12/1987 | Matsuo | 318/38 |
| 4,734,868 A | 3/1988 | DeLacy | 364/519 |
| 4,781,985 A | 11/1988 | Desjarlais | 428/421 |
| 4,782,363 A | 11/1988 | Britt et al. | 355/14 |
| 4,797,018 A | 1/1989 | Hofmann et al. | 400/208 |
| 4,845,490 A | 7/1989 | Ward et al. | 340/825.31 |
| 4,961,088 A | 10/1990 | Gilliland et al. | 355/206 |
| 5,019,839 A | 5/1991 | Watanabe et al. | 346/134 |
| 5,044,800 A * | 9/1991 | Rosenthal | 400/660 |
| 5,048,661 A * | 9/1991 | Toye | 193/35 R |
| 5,077,467 A | 12/1991 | Barron, Jr. et al. | 250/221 |
| 5,111,239 A | 5/1992 | Kamimura et al. | 355/45 |
| 5,138,344 A | 8/1992 | Ujita | 400/175 |
| 5,149,211 A | 9/1992 | Pettigrew | 400/88 |
| 5,184,181 A | 2/1993 | Kurando et al. | 355/260 |
| 5,239,926 A | 8/1993 | Nubson et al. | 101/487 |
| 5,266,968 A | 11/1993 | Stephenson | 400/208 |
| 5,267,800 A | 12/1993 | Petterutl et al. | 400/88 |
| 5,277,501 A | 1/1994 | Tanaka et al. | 400/120 |
| 5,291,227 A | 3/1994 | Suzuki | 346/140 |
| 5,318,370 A | 6/1994 | Nehowig | 400/207 |
| 5,327,201 A | 7/1994 | Coleman et al. | 355/278 |
| 5,368,677 A | 11/1994 | Ueda et al. | 156/362 |
| 5,410,136 A | 4/1995 | McIntire et al. | 235/380 |
| 5,455,617 A | 10/1995 | Stephenson et al. | 400/207 |
| 5,466,319 A | 11/1995 | Zager et al. | 156/220 |
| 5,502,464 A | 3/1996 | Takahashi et al. | 346/25 |
| 5,516,218 A | 5/1996 | Amano et al. | 400/535 |
| 5,530,468 A | 6/1996 | Yoshimi et al. | 347/262 |
| 5,642,877 A | 7/1997 | Green | 271/35 |
| 5,646,388 A | 7/1997 | D'Entremont et al. | 235/380 |
| 5,695,589 A | 12/1997 | German et al. | 156/250 |
| 5,703,347 A | 12/1997 | Reddersen et al. | 235/472 |
| 5,707,162 A | 1/1998 | Kasal et al. | 400/692 |
| 5,709,484 A | 1/1998 | Dorner | 400/188 |
| 5,755,519 A | 5/1998 | Klinefelter | 400/249 |
| 5,772,199 A | 6/1998 | Green | 271/10.06 |
| 5,808,646 A | 9/1998 | Kitahara et al. | 347/104 |
| 5,820,281 A | 10/1998 | Hill et al. | 400/621 |
| 5,837,991 A | 11/1998 | LaManna et al. | 235/475 |
| 5,882,127 A | 3/1999 | Amano | 400/521 |
| 5,927,862 A * | 7/1999 | Debnam et al. | 384/439 |
| 5,936,008 A | 8/1999 | Jones et al. | 523/161 |
| 5,978,621 A | 11/1999 | Glemser et al. | 399/90 |
| 5,980,011 A | 11/1999 | Cummins et al. | 347/4 |
| 5,995,774 A | 11/1999 | Applegate et al. | 399/27 |
| 6,011,741 A | 1/2000 | Wallace et al. | 365/221 |
| 6,037,879 A | 3/2000 | Tuttle | 340/825.54 |
| 6,039,430 A | 3/2000 | Helterline et al. | 347/19 |
| 6,071,024 A | 6/2000 | Chi-Ming et al. | 347/177 |
| 6,072,402 A | 6/2000 | Kniffin et al. | 340/825 |
| 6,076,913 A | 6/2000 | Garcia et al. | 347/19 |
| 6,099,101 A | 8/2000 | Maurelli et al. | 347/7 |
| 6,099,178 A | 8/2000 | Spurr et al. | 400/207 |
| 6,113,208 A | 9/2000 | Benjamin et al. | 347/7 |
| 6,163,658 A | 12/2000 | Suzuki | 399/12 |
| 6,179,401 B1 | 1/2001 | Stephens, Jr. et al. | 347/19 |
| 6,213,392 B1 | 4/2001 | Zuppicich | 235/380 |
| 6,252,791 B1 | 6/2001 | Wallace et al. | 365/221 |
| 6,253,329 B1 | 6/2001 | Kang | 713/300 |
| 6,263,170 B1 | 7/2001 | Bortnem | 399/13 |
| 6,264,296 B1 | 7/2001 | Klinefelter et al. | 347/4 |
| 6,264,301 B1 | 7/2001 | Helterline et al. | 347/19 |
| 6,267,463 B1 | 7/2001 | Paulsen | 347/19 |
| 6,271,928 B1 | 8/2001 | Bullock et al. | 358/1.16 |
| 6,279,901 B1 * | 8/2001 | Fulmer | 271/272 |
| 6,302,527 B1 | 10/2001 | Walker | 347/50 |
| 6,305,795 B2 | 10/2001 | Childers et al. | 347/86 |
| 6,312,083 B1 | 11/2001 | Moore | 347/19 |
| 6,312,106 B1 | 11/2001 | Walker | 347/50 |
| 6,325,495 B1 | 12/2001 | Foth | 347/84 |
| 6,341,839 B1 | 1/2002 | Burikov et al. | 347/37 |
| 6,371,586 B1 | 4/2002 | Saruta | 347/7 |
| 6,405,055 B1 | 6/2002 | Silverbrook et al. | 455/556 |
| 6,464,317 B2 | 10/2002 | Miyazawa | 347/14 |

OTHER PUBLICATIONS

"Standard Read/Write Identification IC", by TEMIC Semiconductor GmbH, Heilbronn, Germany, (Apr. 1999).

"Introducing the New SmartGuard™ and SmartShield™ Advanced Security Options", pamphlet by Fargo Electronics, Inc., Eden Prairie, Minnesota (1998).

"RFID Tagging IC is First to Accept Input from Sensors", by Microchip Technology Inc., (undated).

Two page web site advertisement from SEIKO Precision, entiltled "The lastest design for your CD–R", re: CD Printer 2000.

Two page web site advertisement from Seiko Precision, entitled "Printer 2000".

Two page web site advertisement from SEIKO Precision, entitled "CD Printer 4000".

Partial International Search for International Application No. PCT/US 01/17146, filed May 25, 2001 (with Invitation to Pay Fees).

International Search Report for International Application No. PCT/US 00/01697, filing date Jan. 21, 2000, dated Oct. 18, 2000.

Streamfeeder—ST 1250 Universal Friction Feeder; last modified Feb. 27, 2000; 1 page with heading of "Streamfeeder—Product Index"; and 3 pages with heading of "Streamfeeder—ST 1250 Universal Friction Feeder".

* cited by examiner

CARD TRANSPORT MECHANISM ROLLER SUPPORT

The present invention is a Continuation-in-Part of U.S. application Ser. No. 09/866,309, "INK JET CARD PRINTER", filed May 25, 2001, which in turn claims the benefit of U.S. Provisional Application No. 60/207,494, filed May 26, 2000, and entitled "INKJET CARD PRINTER" and is a Continuation-in-Part of U.S. application Ser. No. 09/702,116, filed Oct. 30, 2000, and entitled "INK JET IDENTIFICATION CARD PRINTER SYSTEM," which is a Continuation-in-Part of U.S. Application Ser. No. 09/178,455, filed Oct. 23, 1998 is now U.S. Pat. No. 6,264,296, and entitled "INK JET IDENTIFICATION CARD PRINTER WITH LAMINATION STATION," which in turn claims the benefit of U.S. Provisional Application Ser. No. 60/063,043, filed Oct. 24, 1997. Additionally, reference is hereby made to the following related co-pending applications filed on Apr. 19, 2002: application Ser. No. 10/126,428, entitled "IDENTIFICATION CARD PRINTER HAVING MULTIPLE CONTROLLERS," for inventors Gary W. Klinefelter, Leonid S. Gershenovich, Gary A. Lenz, and Robert E. Francis; application Ser. No. 10/126,427, entitled "IDENTIFICATION CARD PRINTER," for inventors Martin A. Pribula, James R. Meier, Stacy W. Lukaskawcez, Gary M. Klinefelter, Leonid S. Gershenovich, Gary A. Lenz, and Jeffrey D. Upin; application Ser. No. 10/126,441, entitled "CARD CARTRIDGE," for inventors Martin A. Pribula, James M. Meier, Stacy W. Lukaskawcez, Anthony L. Lokken, Gary M. Klinefelter, Gary A. Lenz and Jeffrey D. Upin; application Ser. No. 10/126,439, entitled "CARD CARTRIDGE AND CARD FEEDER ADAPTER FOR AN INK JET SHEET FEEDER PRINTER," for inventors Gary M. Klinefelter, Martin A. Pribula, Leonid S. Gershenovich and Stacy W. Lukaskawcez; and application Ser. No. 10/126,440, entitled "IDENTIFICATION CARD PRINTER DATA ENCODER MODULE," for inventors Darrell T. Olson and Matthew K. Dunham. All of the above-referenced applications are incorporated herein by reference in their entirety.

FIELD OF THE INVENTION

The present invention relates to identification card printers used to print images on a surface of rigid or semi-rigid planar substrates. More particularly, the present invention relates to a roller support for use in a transport mechanism of an identification card printer that provides support for feed and guide rollers.

BACKGROUND OF THE INVENTION

Identification card printers along with the aid of a computer are typically used to form identification cards by printing an image on a card substrate. The image generally includes a photograph and other information relating to the card holder, such as the card holder's name, employee number, and other information. Such identification cards are used for many purposes, such as driver's licenses, identification badges, etc. The image that is to be printed on the card by the identification card printer is generally formed by combining textual and graphical portions received from host applications running on the computer or from other input devices such as keyboards, scanners, and digital cameras. Data relating to the formatted image is then provided to the printer in the form of a print job. The printer processes the print job by printing the image onto a surface of the card.

Most identification card printers are thermal based printers that include a ribbon having primary colored dye panels and a thermal printhead. One type of thermal based printer is a dye sublimation printer, in which the thermal printhead heats the ribbon and causes dye on the colored panels to be released and sublimate into a surface of the card. Unfortunately, these printers are only compatible with cards having a specialized surface into which the dye can sublimate. Furthermore, these printers are generally incapable of providing full edge-to-edge printing due to problems caused by the ribbon adhering to the edges of the card. Another type of thermal based printer prints the image onto a film, which is subsequently laminated to the card. This type of thermal base printer has full edge-to-edge printing capability, which is achieved by printing an image onto the film that is larger than the surface of the card on which it is to be laminated. Unfortunately these printers are complex and often too expensive for small operations.

Another type of identification card printer is an ink jet based card printer. These printers are typically more affordable than thermal based printers and are somewhat less complicated. Ink jet card printers generally include an ink jet printhead and a transport mechanism. The ink jet printhead is designed to form the desired image on a surface of a card by spraying colored ink onto portions of the surface that are presented to the ink jet printhead in a print position by the transport mechanism.

Typical transport mechanisms include a platen positioned immediately below the printhead and rollers positioned adjacent the printhead that pinch the card against the platen as it is transported through the print position. Typical ink jet printers are generally incompatible with semi-rigid substrates. Instead, thin and highly flexible substrates must be used that can bend around the platen and other rollers of the transport mechanism as they are transported. Additionally, the rollers typically contact side portions of the surface of the card when in the print position thereby obstructing the surface of the card and preventing the ink jet printhead from printing on the surface in those locations. As a result, these types of ink jet card printers are incapable of full edge-to-edge printing on the card.

Even if the rollers of the transport mechanism were positioned such that the ink jet printhead would have the freedom to print, for example, from a side edge of the card to an opposing side edge, this type of printer is still prevented from printing edge-to-edge due to the contamination of the platen and other components of the transport mechanism that would result from springing beyond the edges of the card as would be required for full edge-to-edge printing on the card. In addition to potentially clogging the transport mechanism and causing the printer to fail, the resulting contaminated components of the transport mechanism would transfer the contaminating ink to the cards that are subsequently processed. As a result, most ink jet card printers are not suitable for full edge-to-edge printing and, instead, limit printing on the substrate to a smaller area defined by margins formed along the edges of the substrate.

Some ink jet card printers, however, include modified transport mechanisms that avoid some of the problems described above. These printers allow printing on surfaces of semi-rigid cards by adapting the transport mechanism to transport the cards through the printer in a tray. The trays generally include a depressed region that conforms to the shape of the card and exposes a top planar surface of the card on which an image is to be printed. Unfortunately, these printers are still unable to provide full edge-to-edge printing capability without contaminating the tray and other components of the transport mechanism.

There is a continuing need for improvements to identification card printers including improvements to transport mechanisms in order to provide full edge-to-edge printing capability, increased reliability and performance, and simplified manufacturing.

SUMMARY OF THE INVENTION

The present invention is directed to a roller support for use in a transport mechanism of an identification card printer. The roller support can be used to form single and/or dual pinch roller assemblies that can feed and support cards and allow for full edge-to-edge printing capability. The roller support includes a body member, a bushing member, and a step member. The body member includes a first guide roller receiver that is adapted to receive an end of a first guide roller. The bushing member extends from a surface of the body member and has a central bore that extends through the body member. The step member is positioned adjacent the bushing member and extends from the surface of the body member in the direction of the bushing member.

Other features and benefits that characterize embodiments of the present invention will be apparent upon reading the following detailed description and review of the associated drawings.

DETAILED DESCRIPTION OF THE PREFERRED EMBODIMENTS

Figure 1:
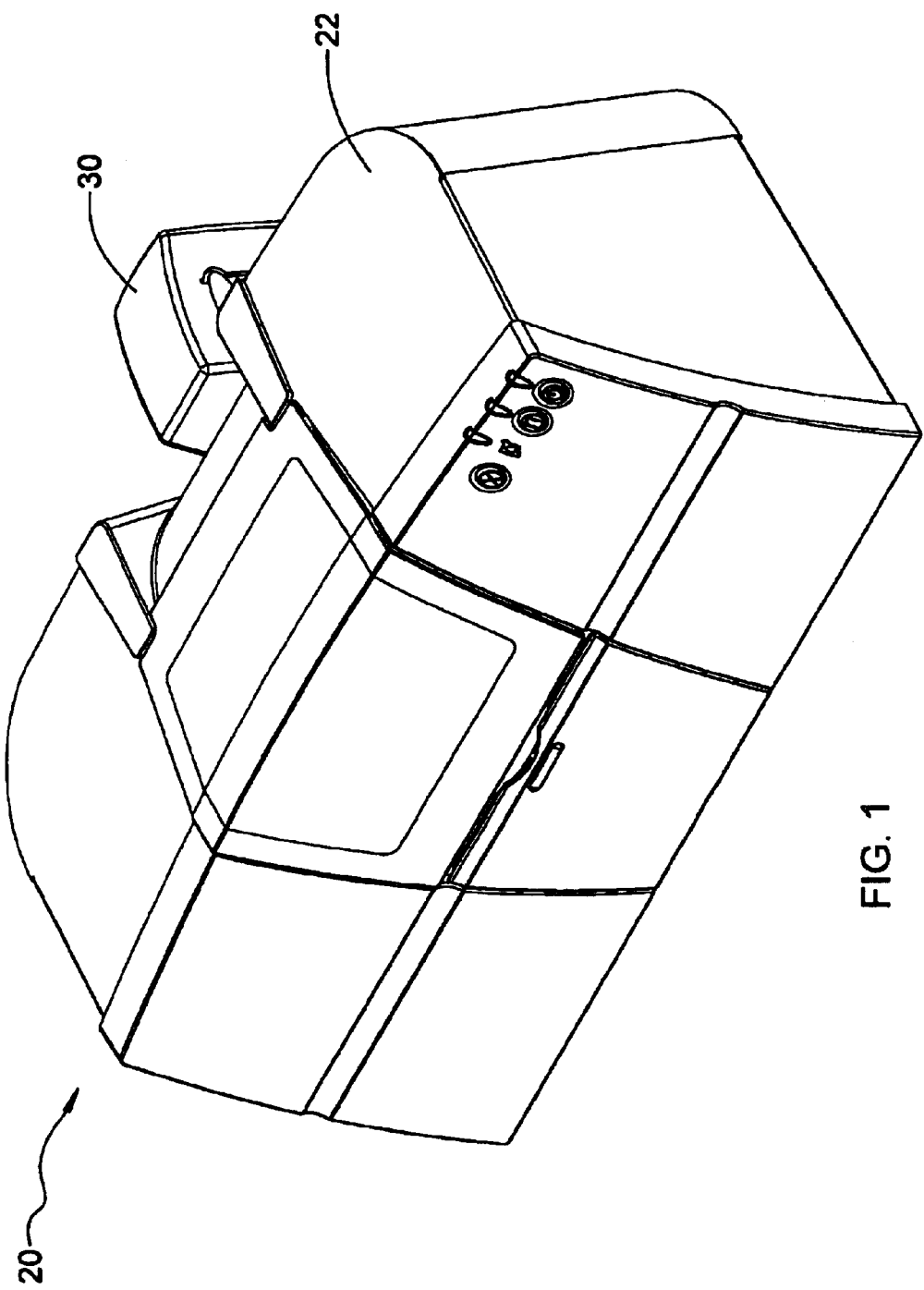
FIGS. 1 and 2 are perspective views of examples of an identification card printer respectively with and without a cover.
Figure 2:
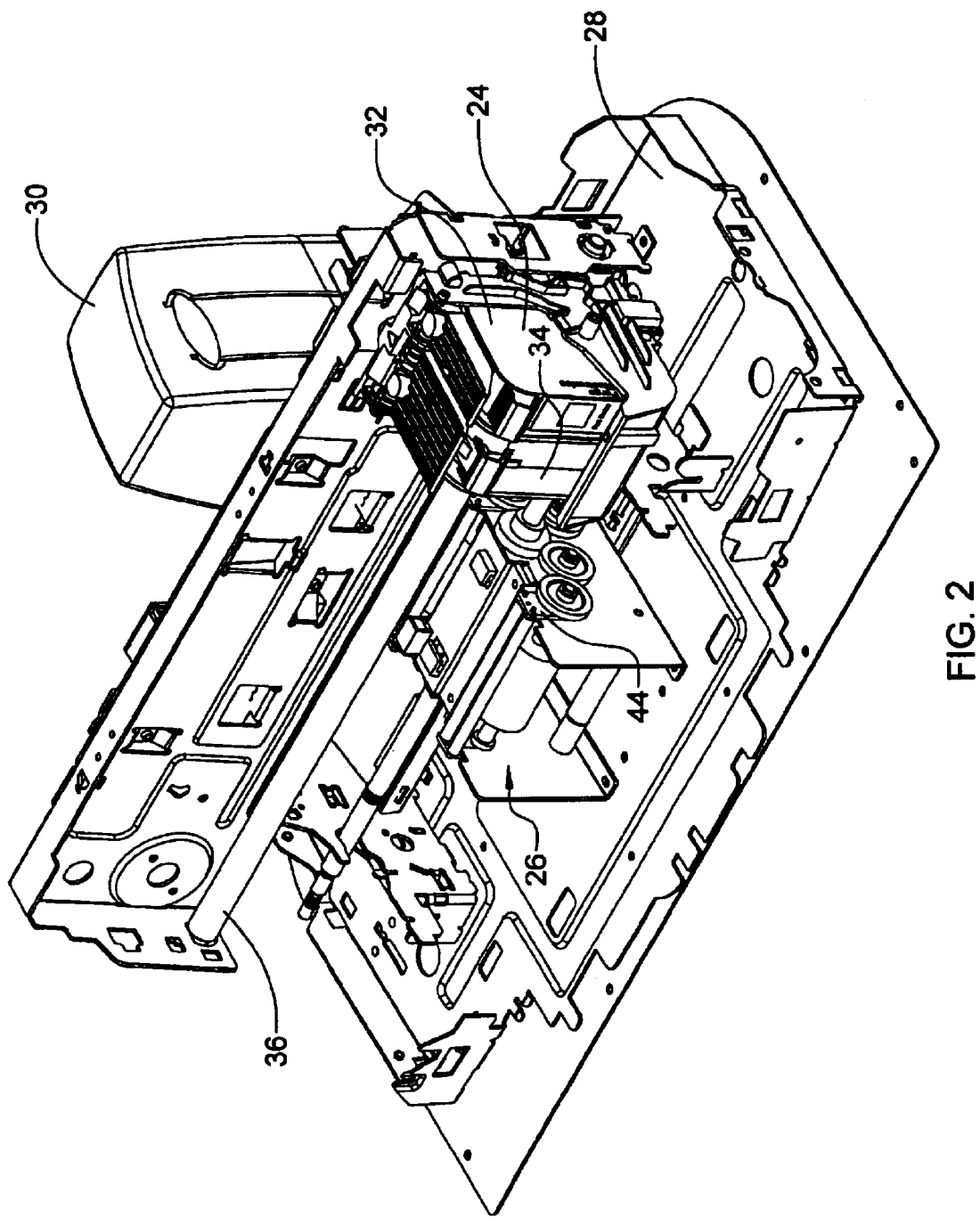

FIGS. 1 and 2 are perspective views of an example of an identification card printer 20 respectively with and without a cover 22, with which embodiments of the present invention can be used. Printer 20 generally includes a print mechanism 24, a transport mechanism 26, a base 28, and printer electronics (not shown) that control the operation of the components of printer 20. Printer 20 can receive cards for processing from a card cartridge 30 and deliver the cards to print mechanism 24 for printing using transport mechanism 26.

Print mechanism 24 is depicted as an ink jet printhead having color and black ink jet cartridges 32 and 34, as shown in FIG. 2. Print mechanism 24 can also be a thermal printhead in combination with a thermal print ribbon, or other suitable print mechanism. Print mechanism 24 is generally moved back and forth along rail 36 in a direction that is transverse to the card path along which transport mechanism 26 feeds the cards. Print mechanism 24 prints image lines on cards that are presented in a print position by transport mechanism 26 to form the desired image. Once the printing is complete, the printed card can be discharged into a card hopper or other card processing device by transport mechanism 26.

Figure 3:
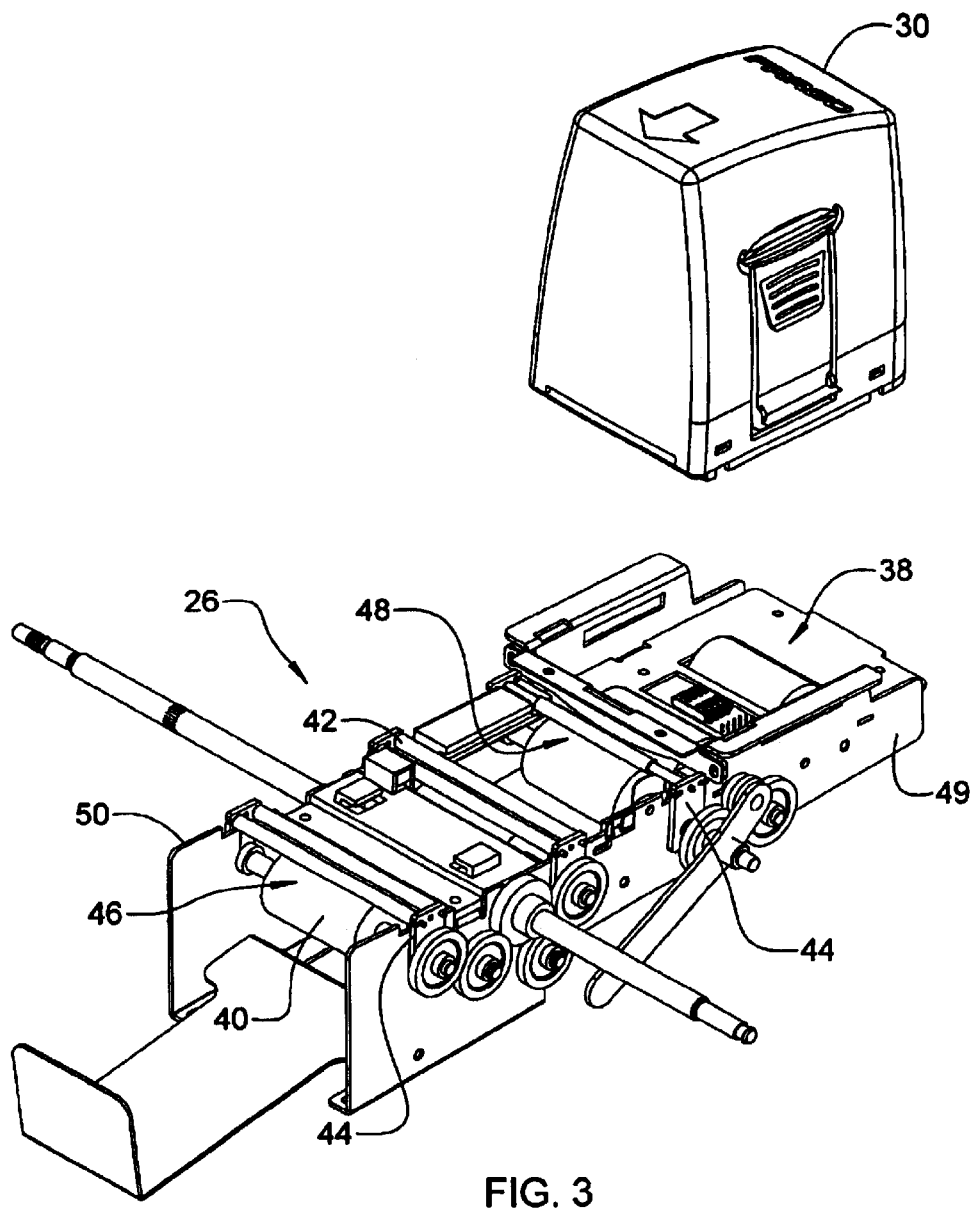
FIG. 3 is a perspective view of an example of a transport mechanism with a card cartridge lifted off a cartridge receiver.

As discussed above, transport mechanism 26 is adapted to deliver cards from card cartridge 30 along a print path to print mechanism 24 for printing. FIG. 3 shows a perspective view of transport mechanism 26 with card cartridge 30 lifted off a cartridge receiver 38, to which it is mounted for operation with identification card printer 20. Transport mechanism 26 includes a plurality of feed rollers 40 and guide rollers 42, some of which are driven by a motor (not shown).

The feed and guide rollers 40 and 42 are mounted to roller supports 44 of the present invention to form dual and single pinch roller assemblies 46 and 48, respectively. Roller supports 44 mount to side walls 49 and 50 of transport mechanism 26, which are mounted to base 28 of printer 20. Roller supports 44 simplify the assembly of printer 20 by allowing the dual and single pinch roller assemblies to be installed after side walls 49 and 50 of transport mechanism 26 have been mounted to base 28. This allows for the installation of, and adjustment to, other printer components, which would otherwise be obstructed by the pinch roller assemblies 46 and 48.

Figure 4A:
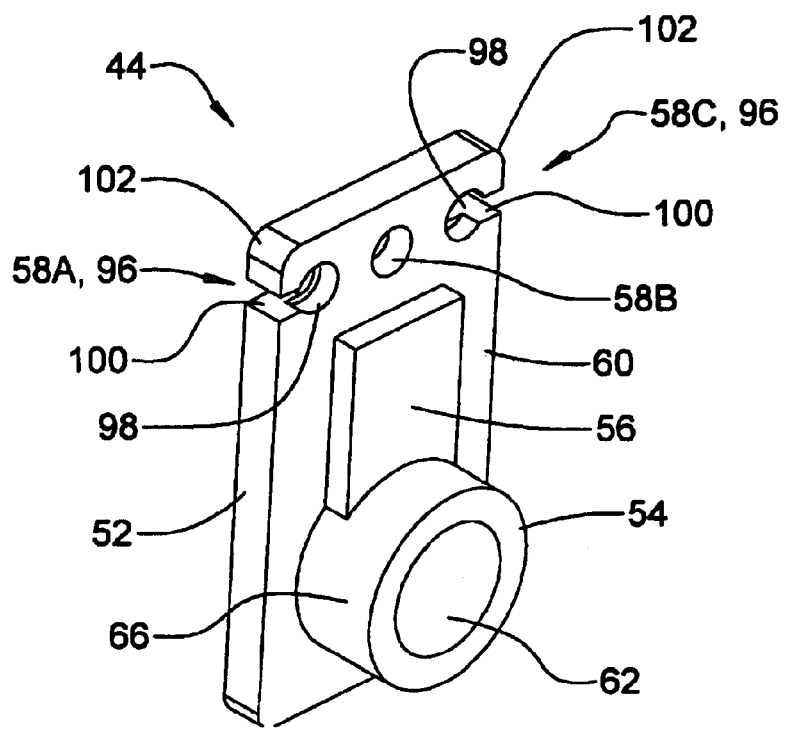
FIGS. 4A and 4B are respectively front and rear perspective views of a roller support in accordance with embodiments of the invention.
Figure 4B:
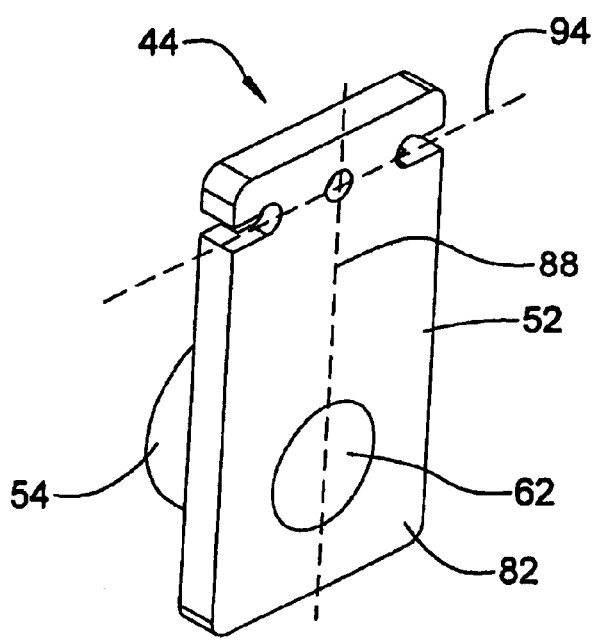

Referring to FIGS. 4A and 4B, each roller support 44 includes a body member 52, a bushing member 54, and a step member 56. Body member 52 includes at least one guide roller receiver, such as guide roller receivers 58A–C, that are each adapted to receive an end of a guide roller 42. Bushing member 54 extends from an inside surface 60 of body member 52 and has a central bore 62 that extends through body member 52. Central bore 62 is generally sized to accept an axle of a feed roller 40.

Figure 5:
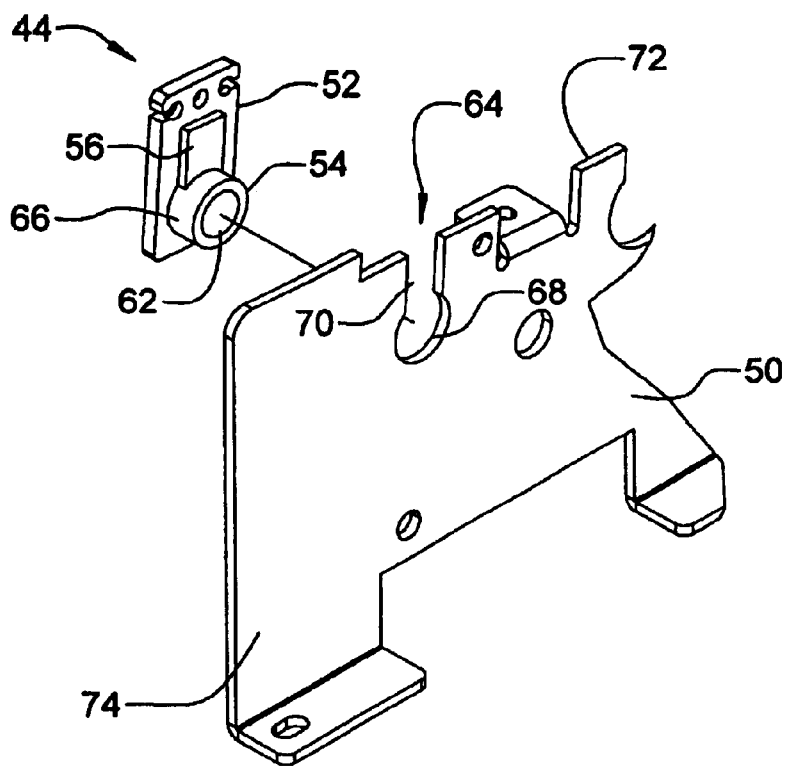
FIGS. 5 and 6 illustrate the mounting of the roller support of FIG. 4 to a side wall of a transport mechanism in accordance with an embodiment of the invention.
Figure 6:
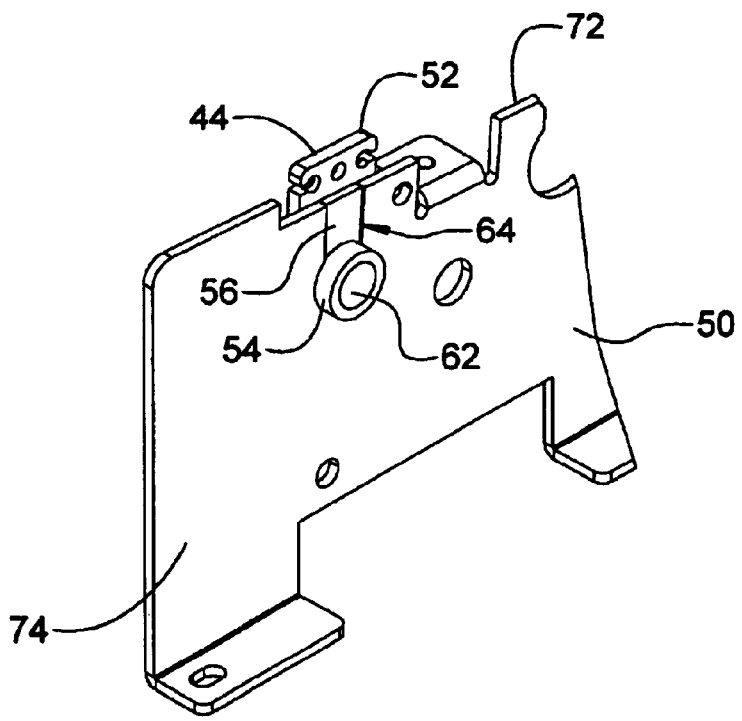

Roller support 44 is adapted to mount to side walls 49 and 50 at support receiving notches 64 as illustrated in FIGS. 5 and 6. Bushing member 54 has an exterior surface 66 that substantially conforms to a lower portion 68 of support receiving notch 64. Step member 56 is also shaped to conform to an upper portion 70 of support receiving notch 64. This configuration requires the horizontal insertion of roller support 44 into support receiving notch 64 from an exterior side 72 of the side wall due to the "key hole" shape of support receiving notch 64. Bushing member 54 prevents roller support 44 from sliding out of support receiving notch 64 in a vertical direction while step member 56 operates to prevent rotation of roller support 44 in a plane that is aligned with the side wall of transport mechanism 26. The portion of body member 52 surrounding bushing member 54 and step members 56 prevents support 44 from sliding through support receiving notch 64 to an interior side 74 of the side wall.

Figure 7:
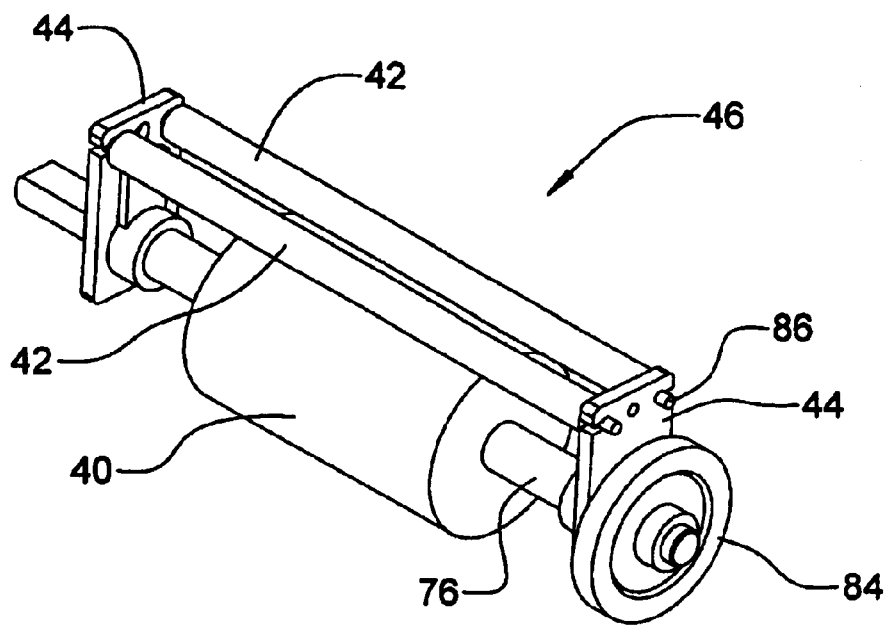
FIGS. 7 and 8 are respectively assembled and exploded views of a dual pinch roller assembly in accordance with embodiments of the invention.
Figure 8:
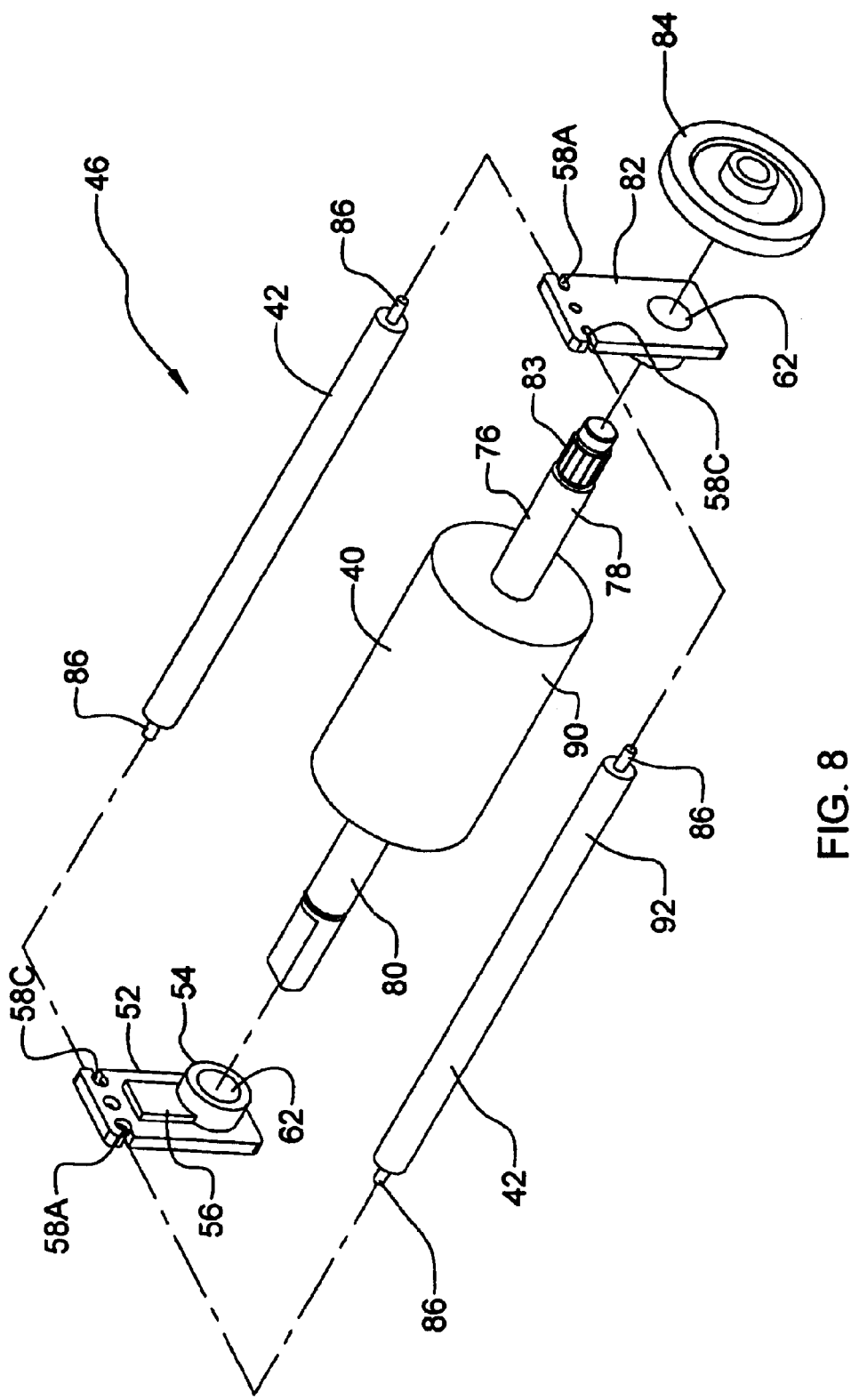
Figure 9:
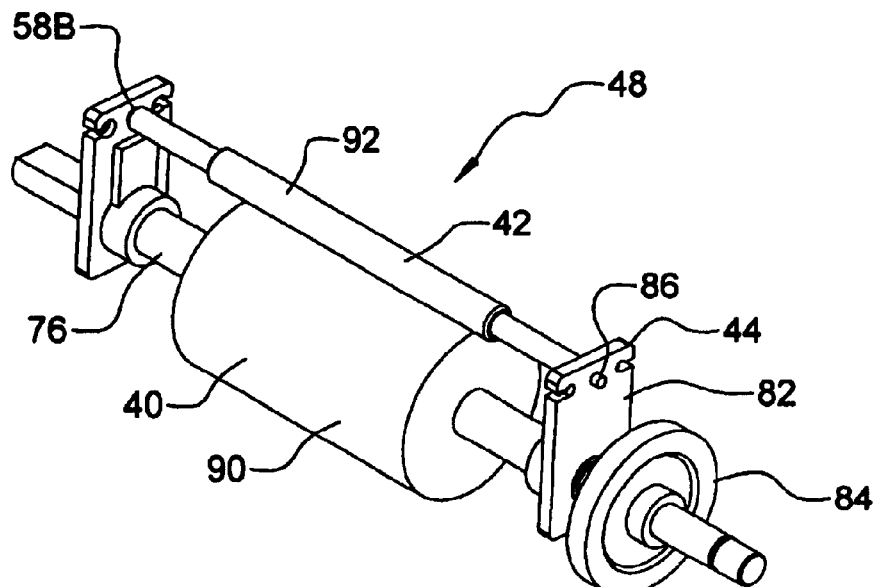
FIGS. 9 and 10 are respectively assembled and exploded views of a single pinch roller assembly in accordance with embodiments of the invention.
Figure 10:
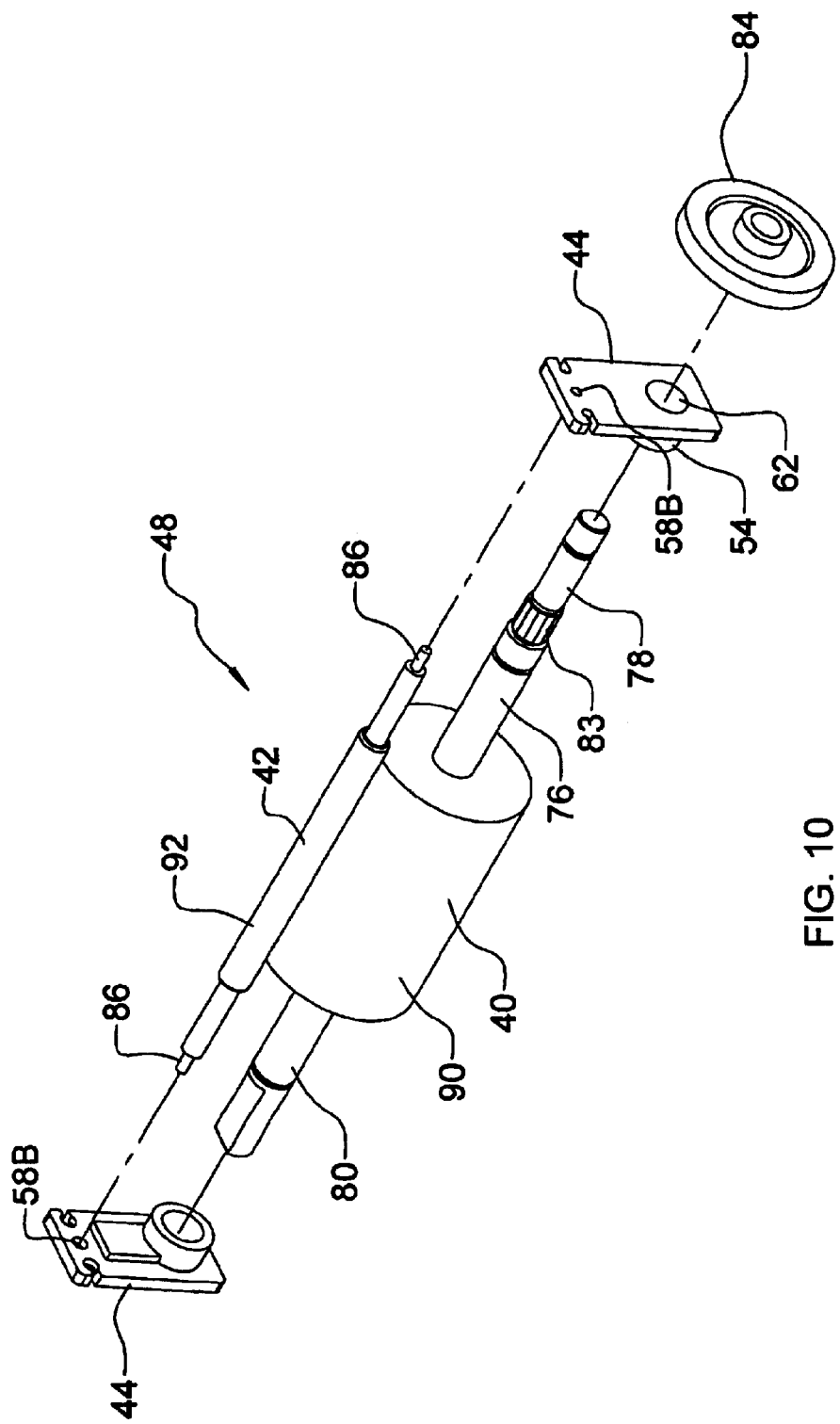

As mentioned above, roller supports 44 are used to form dual and single pinch roller assemblies 46 and 48 for use in transport mechanism 26. FIGS. 7 and 8 show assembled and exploded views of a dual pinch roller assembly 46, and FIGS. 9 and 10 show assembled and exploded views of a single pinch roller assembly 48, in accordance with embodiments of the present invention. Both the dual and single pinch roller assemblies 46 and 48 include a feed roller 40 that has an axle 76. Feed roller 40 is mounted to support 44 by lowering axle 76 onto support receiving notches 64 of side walls 49 and 50 then extending the ends of axle 76 through bore 62 of bushing members 54 as they are inserted in support receiving notches 64. Supports 44 are secured to side walls 49 and 50 by attachment of a suitable member to ends 78 and 80 of axle 76 that abuts outside surface 82 of support 44. For example, end 78 of axle 76 can include a knurled surface 83 that allows for the press-fit mounting of a gear 84 or other member to end 78. Gear 84 can then be driven by a motor to drive feed roller 40.

Single pinch roller assembly 48 includes a single guide roller 42 that mounts to guide roller receiver 58B of the supports 44 as shown in FIGS. 9 and 10. Guide roller 42 is mounted to supports 44 at the same time as the installation of feed roller 40 by inserting ends 86 into guide roller receivers 58B of supports 44. Guide roller receiver 58B is preferably an aperture aligned with a first axis 88, shown in FIG. 4B, running through the center of central bore 62 such that guide roller 42 is positioned immediately above feed roller 40 when installed.

The distance separating the exterior surfaces 90 and 92 of feed and guide rollers 40 and 42, respectively, is determined by the distance separating guide roller receiver 58B and central bore 62 and the diameter of feed and guide rollers 40 and 42. This distance is smaller than the thickness of the cards to be fed by transport mechanism 26 to provide the desired pinch feeding of the cards by driving feed roller 40 with a motor. Additionally, exterior surface 90 of feed roller 40 is preferably compressible to enhance its card-gripping ability for reliable card feeding.

Dual pinch roller assembly 46 includes two guide rollers 42 that mount to guide roller receivers 58A and 58C of the supports 44 as shown in FIGS. 7 and 8. Guide roller receivers 58A and 58B can be apertures that are sized to accommodate ends 86 of guide rollers 82, in the same manner as guide roller receiver 58B. Thus, installation of the guide rollers 42 and guide roller receivers 58A and 58B is performed at the same time as the installation of feed roller 40 as discussed above. In accordance with one embodiment, guide roller receivers 58A–C are aligned along a second axis 94 that is transverse to the first axis 88, as shown in FIG. 4B. Guide roller receivers 58A and 58C are preferably equidistantly spaced from the first axis 88. Dual pinch roller assembly 46 can be used as a cantilevering mechanism that is adapted to cantilever a card, which can allow printer 20 to perform full-edge-to-edge printing with an ink jet print mechanism 24.

In accordance with another embodiment, guide roller receivers 58A and 58C are formed as snap-in notches 96, shown in FIG. 4A, that allow for the snap-fit assembly of guide rollers 42 to roller supports 44 after roller supports 44 and feed roller 40 have been installed on side walls 49 and 50 of transport mechanism 26. The snap-in notches 96 extend horizontally in body member 52 and include seat and constricted portions 98 and 100, respectively. The seat portion 98 is sized to receive the end 86 of a guide roller 42, whereas the constricted portion 100 restricts the insertion and removal of end 86 of guide roller 42. Guide roller 42 is installed, or press-fit assembled, to roller support 44 by placing an end 86 adjacent the opening to constricted portion 100 and pressing end 86 toward seat portion 98 which causes prong 102 to flex slightly and allow end 86 of guide roller 42 to pass through constricted portion 100 and be received by seat portion 98. Roller supports 44 are preferably formed of plastic or other suitable material that allows prong 102 to flex during snap-fit assembly of dual pinch roller assembly 46.

Although the present invention has been described with reference to preferred embodiments, workers skilled in the art will recognize that changes may be made in form and detail without departing from the spirit and scope of the invention.

What is claimed is:

1. A roller support for mounting to a side wall of an identification card printer transport mechanism, the support comprising:
    a body member having a first guide roller receiver adapted to receive an end of a first guide roller;
    a bushing member extending from a surface of the body member and having a central bore that extends through the body member; and
    a step member adjacent the bushing member and extending from the surface of the body member.

2. The support of claim 1, wherein the first guide roller receiver includes a snap-in notch having a constricted portion and a seat portion, the seat portion sized to receive the end of the first guide roller.

3. The support of claim 1, wherein the body member includes a second guide roller receiver aligned with the first guide roller receiver along a second axis and adapted to receive an end of a second guide roller.

4. The support of claim 3, wherein the first and second guide roller receivers each include a snap-in notch having a constricted portion and a seat portion, each seat portion sized to receive the end of one of the first and second guide rollers.

5. The support of claim 3, wherein the first and second guide roller receivers are displaced from a first axis that is transverse to the second axis and aligned with the cylindrical bore.

6. The support of claim 1, wherein the cylindrical bore and the first guide roller receiver are substantially aligned along a first axis.

7. The support of claim 6, wherein the body member includes second and third guide roller receivers substantially aligned with the first guide roller receiver along a second axis and displaced from the first axis, the second and third guide roller receivers each sized to receive an end of a guide roller.

8. The support of claim 7, wherein the second and third guide roller receivers each include a snap-in notch having a constricted portion and a seat portion, the seat portion being sized to receive the end of one of a guide roller and the constricted portion being sized to resist removal of the end of the guide roller from the seat portion.

9. A pinch roller assembly of a transport mechanism of an identification card printer comprising:
    a pair of side walls, each having a support receiving notch;
    a pair of roller supports each seated in one of the support receiving notches, each support comprising:
        a body member adjacent an exterior side of the side wall and having a first guide roller receiver adapted to receive an end of a guide roller;
        a bushing member extending from a surface of the body member and into the support receiving notch, the bushing having a central bore that extends through the body member; and
        a step member adjacent the bushing and extending from the surface of the body member and into the support receiving notch;
    a feed roller having opposing ends extending through the central bores of the bushing members; and
    a first guide roller having ends that are supported by the first guide roller receivers of the roller supports.

10. The assembly of claim 9, wherein the first guide roller receivers each include a snap-in notch having a constricted portion and a seat portion, each seat portion sized to receive the end of the first guide roller, the constricted portion being sized to resist removal of the end of the first guide roller from the seat portion.

11. The assembly of claim 9, wherein:
   each body member includes a second guide roller receiver aligned with the first guide roller receiver along a second axis and adapted to receive an end of a second guide roller; and
   a second guide roller having ends that are supported by the second guide roller receivers of the roller supports.

12. The assembly of claim 11, wherein the first and second guide roller receivers each include a snap-in notch having a constricted portion and a seat portion, each seat portion sized to receive an end of the corresponding guide roller.

13. The assembly of claim 11, wherein the first and second guide roller receivers for each roller support are displaced from a first axis that is transverse to the second axis and aligned with the cylindrical bore.

14. The assembly of claim 9, wherein the cylindrical bore and the first guide roller receiver of each roller support are substantially aligned along a first axis.

15. The assembly of claim 13, wherein each roller support includes a third guide roller receiver between the first and second guide roller receivers.

* * * * *